US008168102B2

(12) United States Patent
Di Berardino

(10) Patent No.: US 8,168,102 B2
(45) Date of Patent: May 1, 2012

(54) MACHINE UTILIZED FOR PRODUCING AND MANUFACTURING A RESILIENT FILM SOFT AT TOUCH, SUITABLE TO DRAINING USE

(75) Inventor: Fabio Di Berardino, Roccamontepiano (IT)

(73) Assignee: Texol S.R.L., Alanno Scalo (Pescara) (IT)

( * ) Notice: Subject to any disclaimer, the term of this patent is extended or adjusted under 35 U.S.C. 154(b) by 0 days.

(21) Appl. No.: 12/302,497

(22) PCT Filed: May 30, 2007

(86) PCT No.: PCT/IT2007/000381

§ 371 (c)(1), (2), (4) Date: Nov. 25, 2008

(87) PCT Pub. No.: WO2007/138640

PCT Pub. Date: Dec. 6, 2007

(65) Prior Publication Data

US 2009/0302504 A1 Dec. 10, 2009

(30) Foreign Application Priority Data

Jun. 1, 2006 (IT) .............................. CH2006A0026

(51) Int. Cl.
*B29C 59/04* (2006.01)
*B29C 59/06* (2006.01)

(52) U.S. Cl. . 264/156; 425/290; 425/294; 425/DIG. 37; 83/30; 83/660

(58) Field of Classification Search .................. 264/156; 425/290, 294, DIG. 37; 28/106; 83/30, 660; 226/94, 95

See application file for complete search history.

(56) References Cited

U.S. PATENT DOCUMENTS

| | | | |
|---|---|---|---|
| 3,435,190 | A | 3/1969 | Schirmer |
| 4,609,518 | A | 9/1986 | Curro |
| 4,839,216 | A | 6/1989 | Curro |

(Continued)

FOREIGN PATENT DOCUMENTS

| | | |
|---|---|---|
| GB | 2 055 669 | 3/1981 |

(Continued)

OTHER PUBLICATIONS

PCT Written Opinion for PCT/IT2007/000381 in the name of TEXOL S.R.L. filed on May 30, 2007.

(Continued)

*Primary Examiner* — Richard Crispino
*Assistant Examiner* — Robert Dye
(74) *Attorney, Agent, or Firm* — Steinfl & Bruno, LLP

(57) ABSTRACT

A machine utilized for producing and manufacturing a film, soft at touch, resilient and suitable at draining use. A film produced by such a machine, presents, at least, on one surface an essentially continuous pattern of micro-funnels three-dimensional (3D) directed in an essentially perpendicular way to the surface from which the micro-openings have origin. It presents also on the opposite surface a continuous pattern, composed by 3D macro-funnels directed in an essentially perpendicular way to the surface from which the macro-funnels have origin. The "micro-funnels" term, intend to describe a multitude of funnels non distinguishable by the human eye at a distance equal or higher than 450 mm. while the "macro funnels" term, intend to describe funnels clearly visible by the human eye at a distance higher than 450 mm.

18 Claims, 4 Drawing Sheets

U.S. PATENT DOCUMENTS

| | | | | |
|---|---|---|---|---|
| 6,739,024 | B1 * | 5/2004 | Wagner | 28/106 |
| 6,780,372 | B2 | 8/2004 | Gray | |
| 6,884,494 | B1 | 4/2005 | Curro et al. | |
| 7,192,392 | B2 * | 3/2007 | Muth et al. | 493/63 |
| 7,294,238 | B2 * | 11/2007 | Bakken et al. | 162/362 |
| 2003/0085213 | A1 * | 5/2003 | Burckhardt et al. | 219/243 |
| 2004/0161586 | A1 | 8/2004 | Cree et al. | |
| 2004/0209067 | A1 * | 10/2004 | Muth et al. | 428/314.4 |
| 2005/0049567 | A1 | 3/2005 | Cree et al. | |
| 2006/0063454 | A1 * | 3/2006 | Chung et al. | 442/327 |

FOREIGN PATENT DOCUMENTS

| | | |
|---|---|---|
| WO | 99/30658 | 6/1999 |
| WO | 01/03895 | 1/2001 |

OTHER PUBLICATIONS

PCT International Search Report for PCT/IT2007/000381 filed on May 30, 2007 in the name of Fabio Di Berardino.

Communication pursuant to Article 94(3) EPC issued by EPO for EP Application No. 07790113.0 dated Oct. 6, 2009.

Communication pursuant to Article 94(3) EPC issued by EPO for EP Application No. 07790113.0 dated May 26, 2009.

Stay of Grant Proceedings under Rule 14 EPC issued by EPO for EP Application No. 07790113.0 dated Jan. 26, 2010.

Third party (Tredegar) request for suspension of the EPO proceedings for EP Application No. 07790113.0 dated Nov. 23, 2009.

* cited by examiner

MACHINE UTILIZED FOR PRODUCING AND MANUFACTURING A RESILIENT FILM SOFT AT TOUCH, SUITABLE TO DRAINING USE

CROSS REFERENCE TO RELATED APPLICATIONS

This application is the national phase of International Application PCT/IT2007/000381 filed on May 30, 2007 which, in turn, claims priority to Italian Patent Application CH2006A000026 filed on Jun. 1, 2006.

RELATED ART

There exists in the related art, disposable hygienic articles for women, such as absorbent pads, panty liners and internal tampons. It is known that many such articles have a side in contact with the consumer formed by a perforated film with three dimensional apertures. These apertures quickly collect body fluids while remaining dry and clean after the passage of the body fluids.

The disadvantage of such perforated films is the visual and tactile plastic sensation which is unpleasant to consumers.

It is therefore desirable to have available a three dimensional apertured film that is soft to the touch and has a similar appearance to a textile material, whilst maintaining the handling characteristics of the body fluids as per the above mentioned perforated films Currently there exists the production of film with micro perforations. There also exists production of films with a type of micro aperture in 3 dimensions which make the material soft to the touch.

These micro cones can be formed with pressurized water technology or by pneumatic vacuum forming. Both mentioned process are known art.

An improvement of the process and result has been obtained by applying a series of three dimensional apertured macro cones to the film containing micro perforations, which results in improved draining capabilities of the product.

The construction of the macro cones must be such so as not to destroy the micro cones produced beforehand.

Such a result can be obtained in different ways.

In U.S. Pat. No. 4,839,216, as in U.S. Pat. No. 4,609,518, is taught the construction of non shaped macro holes on a film where micro apertures are already present, using a pressurised water technology.

Such a method does not thermoform the macro cones, so limiting the draining properties of the film.

In U.S. Pat. No. 6,780,372, is taught a method for creating thermoformed macro holes whereby the film is locally treated in the thermoforming zone without heating the surrounding area of micro holes.

Whilst the technique of perforating with hot needles is known art, the disadvantage of the macro cones thermoforming process is the tendency to stiffen the film, Also the film tends to stick to the needles creating difficulties in detachment.

In the application of patent US 2.004.161.586, the problem of fused material rims made around the thermo fused cone is solved by interposing a layer of high melting material so as to avoid direct contact between the film and the hot needles.

The high melting material being mechanically more resistant compared to the film to be processed, greatly helps the detachment of the film from the hot needles.

The disadvantages of this last process is that the insertion of the mentioned high melting material means an increase in the cost of the film and an unwanted increase in thickness.

SUMMARY OF INVENTION

The purpose of this invention is the manufacture of a film apertured three dimensionally, soft to the touch, resilient, and with a matt finish, suitable for the efficient correct handling of body fluids, that eliminates the above mentioned disadvantages of the film and the processes to obtain it.

Such a film shows, at least on one side, an almost continuous pattern of three dimensional micro cones, arranged according to an axis close to perpendicular to the surface from where the micro apertures have their origin.

On the opposite side, there is a continuous pattern composed of three dimensional macro cones arranged according to an axis close to perpendicular to the surface from where the macro cones have their origin, where the orientation of the mentioned micro cones and the macro cones are opposite.

The term “micro cones” refers to cones not discernible by human eye at a distance equal to or greater than 450 mm while the term “macro cones” refers to cones clearly visible by human eye at a distance greater than 450 mm.

Because the macro cones are thermoformed on thermoplastic film that already contains the micro cones, the process can cause over-destruction of the micro cones. The technical problem to be solved is to thermoform the macro cones without damaging the micro cones previously made and at the same time maintain the softness of the obtained film.

Technical solutions available today allow a process to thermoform cones using hot needle technology, forcing the film to pass through a calander where, on one reel there are needles while on the other there are holes, each needles fits in the corresponding slot on the other reel, perforating and forcing the contact between needles and film so that thermoforming can occur.

Nevertheless, the time of contact between needles and film is very limited in order to avoid that the whole film reaches temperatures near the softening point, a condition which would prevent the detachment of the film from the needle reel.

Short contact times between needles and film require a higher needle temperature which will melt the thermoplastic film locally also after cooling, the thermoplastic film will harden creating an unpleasant effect to the touch.

Lower film gsm imposed by the market make the actual hot needle technologies not viable for the above mentioned reason.

TECHNICAL DESCRIPTION OF INVENTION

Figure 1:
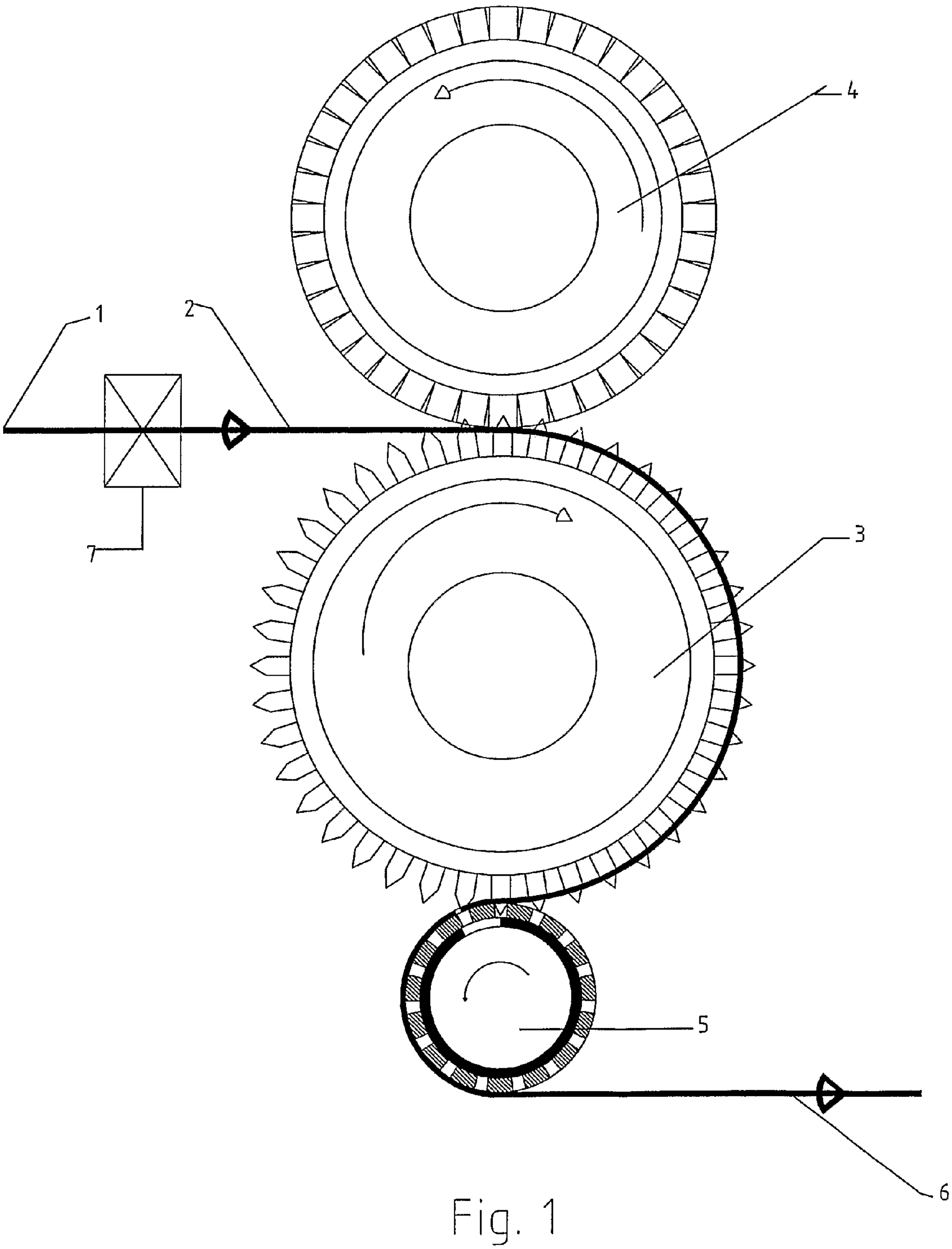
FIG. 1 shows schematically the travel of the micro perforated film between the hot needle calander and perforated reel for the thermoforming of the macro cones and between the hot needle calander and the vacuum reel for the detachment from the needles.

This document explains how to obtain thermoformed macro holes on a thermoplastic matrix where there already exists micro apertures, and to maintain the performance of collection and retention of the discharge of the body fluids and also achieving desirable tactile and visual properties, soft to the touch, even distribution of holes and of a matt finish.

In order to avoid the localized over melting of the thermoplastic film it is necessary to work with temperatures lower than the melting point. To achieve correct formation of the holes it is necessary to work with temperatures above the softening point but substantially below the melting point thus it is necessary to have a much longer contact time between the needles and the film.

The formation of the cone happens by forcing the travel of the film between the needles of the first reel and the corresponding slots in the second reel. Once the cones are created, the film is left in contact with the needles for sufficient time to effect the correct thermo formation. This involves that the whole film reaches a temperature near to the softening point making the detachment of the film from the needles unfeasible with a simple pull because the cohesion force between the needles and the film is such as to ruin the material. This unwanted effect is even more enhanced by use of lower film gsm. To solve this problem a third perforated reel is used. This reel is composed of an external sleeve with holes distributed in such a way that during the rotation each slot engages with a corresponding needle.

The external sleeve rotates an a hollow fixed shaft. The hollow fixed shaft has opening along its length wide enough to cover the contact area between the needles and the third perforated reel. A vacuum is formed inside the hallow fixed shaft which generates a pulling force at the base of the thermoformed cone such as to detach the film from the needles without incurring damage to the film.

Even though the thermoforming process has been slowed minimising the annealing of the film, it is impossible to completely eliminate some hardened or stiffened areas caused by the heating process.

To further minimise this hardening a further step has been developed whereby the film is passed through one or more grooved reels.

The film is appropriately stretched locally so as to break and soften the areas hardened in the thermoforming process especially around the macro cones.

Another method that the invention can employ to detach the thermoplastic film from the needles is by using electrostatic electricity, by which, instead of creating a depressurised area, can charge the film on the third perforated reel with electrostatic charge of opposite polarity, in such a way that an electrostatic force is generated at the base of the thermoformed cones this force detaches the film from the needles, in a way similar to the method described in the previous point.

The localised stretching system can have grooves in both axial or radial directions, therefore creating localised stretching in machine direction or in cross direction.

As can be seen in FIG. 1, thermoplastic film n.1 (normally ldpe and lldpe base) is extruded with cast technology.

The film still in a plastic condition is laid on a matrix 7 that has a variety of micro apertures with a density between 140 holes per sq.cm to 1024 holes per sq.cm and is immediately put under vacuum making the film implode and thus creating the three dimensional micro cones.

The film is left in contact with the matrix for enough time to elapse so that the temperature of the film changes to a temperature that allows the detachment of the film from the matrix.

Such formed film n.2 is now ready for the macro perforation. Subsequently a reel 3 with needles, appropriately thermo regulated at a temperature near to the thermo forming temperature of the thermoplastic film is set to rotate and is synchronised with the pair of perforated reels 4 and 5 with a density of holes equal to the density of needles.

Both perforated reels can be thermo regulated.

The perforated reel 4 has the function of creating the three dimensional cone and can be substituted by a brush reel with high density of bristles. Perforated reel 5 has the function of detaching the perorated film from the needles.

The micro perforated film is passed through the pair of reels 3, 4 creating the three dimensional macro apertures.

The film is then left in contact with the needles for the necessary time to achieve a correct thermoforming. Such a method allows much lower operating temperatures compared to known methods. In fact such a long contact time between film and needle allows operating temperatures of needles near to thermoforming ones or in any case lower than the fusion temperature of the film, limiting the phenomenon of annealing which makes the film rough and wrinkled.

Increasing the contact time between the film and the needles limits the annealing effect on the film but unfortunately the whole film reaches a higher temperature making it difficult to detach the film from the needles. The film in contact with the needles should maintain a temperatures preferably between approximately 50 and 60 degrees C.;

It is known that low gsm films (15-30 gsm) at such high temperatures drastically loose their mechanical characteristics, so that the adhesion force between the needles and just formed macro holes can be such that it makes it unfeasible to detach the film using a force acting directly on the film as this would damage the film.

To achieve successful detachment without damaging the product it is desirable to apply the detaching force to the bottom of the macro holes.

The perforated reel 5 has a pneumatic vacuum chamber so to exert a light force on the base of the macro cones, during rotation, the force exerted by the pneumatic vacuum detaches the film from the needles without modifying the characteristics of the product.

Also the volume of air that crosses the de pressurised sector cools the macro cones just formed.

The film has been detached from the needles by vacuum and travels away from the vacuum aperture and thus free of any rollers.

The film 6, 206 has micro cones 207 produced by micro perforation and macro cones 208 produced by macro perforation.

Figure 2:
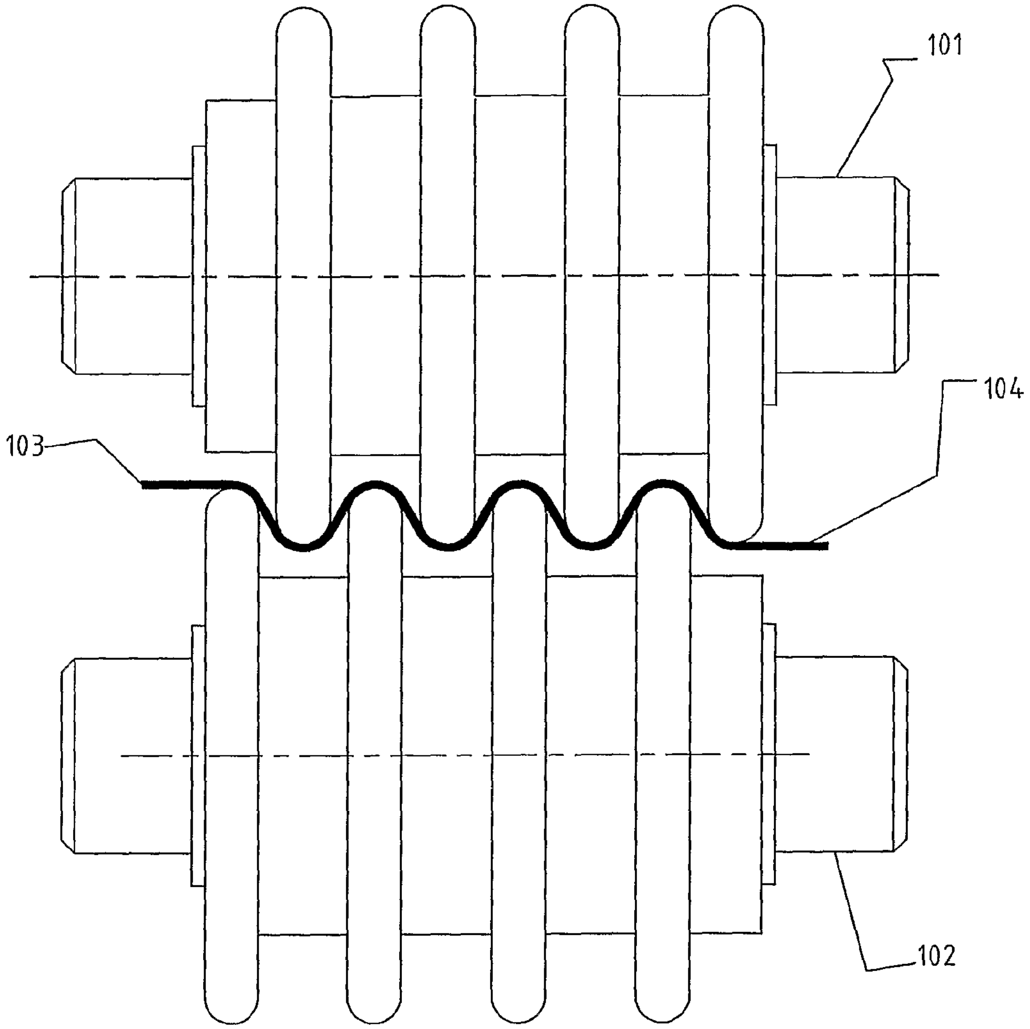
FIG. 2 shows schematically the travel of the product through a series of grooved reels so as to obtain localised stretching.
Figure 3:
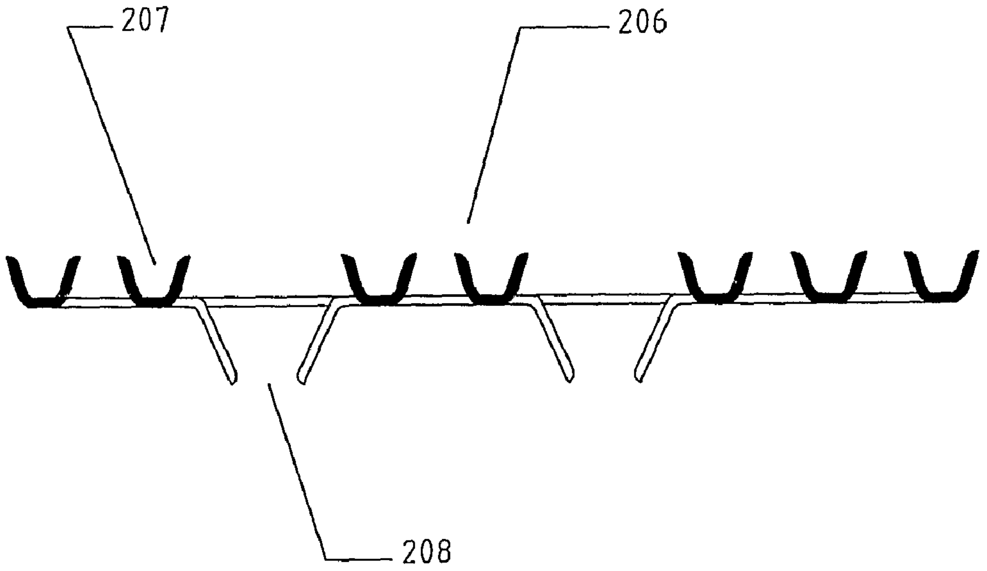
FIG. 3 shows schematically the film with micro holes and macro holes formed in opposite directions.
Figure 4:
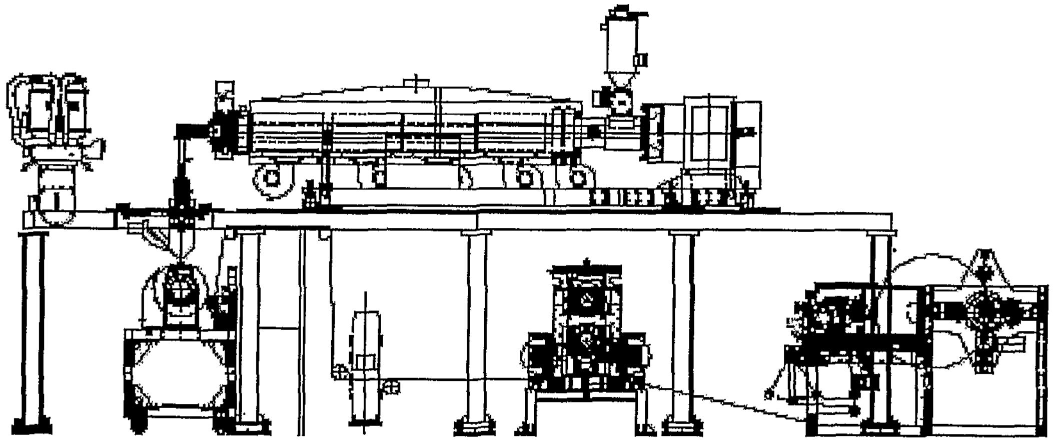
FIG. 4 represents a schematic overall view of an embodiment of the machine according to the disclosure.

The product is now passed through one or more pairs of reels 101, 102 grooved as indicated in FIG. 2.

Film 103 is suitably stretched so to break eventual hardened areas by the thermo forming process especially around the macro cones.

Film 104 is ready to be cooled and winded.

The invention claimed is:

1. A process for thermoforming macro holes on a thermoplastic film already having micro holes, comprising:

passing the thermoplastic film between a first reel with multiple needles and a second reel with multiple slots, maintaining the thermoplastic film adhered to the first reel and at a temperature close and above a softening point of the thermoplastic film and substantially below a melting point of the film to obtain the macro holes, and removing the thermoplastic film from contact with the first reel via a third reel with perforations, the third reel exerting an adhesion strength on the thermoplastic film greater than an adhesion strength of the thermoplastic film to the first reel, wherein the multiple needles of the first reel are coupled, during rotation, into the slots of the second reel and the perforations of the third reel.

2. The process of claim 1, wherein the removed thermoplastic film is additionally passed through one or more grooved reels, causing the thermoformed film to stretch and breaking hardened areas around the macro holes.

3. The process of claim 2, further comprising:

passing the thermoplastic film through axial and/or radial grooves, achieving axial and/or radial stretching of the film.

4. The process of claim 1, wherein the adhesion strength of the third reel on the thermoplastic film is a vacuum-obtained adhesion strength.

5. The process of claim 1, wherein the adhesion strength of the third reel on the thermoplastic film is an electrostatically-obtained adhesion strength through electrostatic electricity charged with opposite polarity to that of the third reel and the thermoplastic film.

6. The process according to claim 1, wherein the micro holes are on one side of a surface of the thermoplastic film and the macro holes are on another side of the surface of the thermoplastic film.

7. The process according to claim 1, wherein, in the removing, the third reel exerts the adhesion strength on the macro holes.

8. The process according to claim 1, wherein the maintaining comprises leaving a needle of the first reel in contact with a slot of the second reel for a time necessary to obtain a macro hole.

9. A device for forming a thermoplastic film with macro holes from a film already having micro holes, comprising:

a first reel with multiple needles on its surface;

a second reel with multiple grooves, the grooves coupled to the needles during the rotation of the first and second reels to obtain the macro holes; and a third reel with perforations, the perforations being coupled with the needles of the first reel during rotation of the first reel to remove the thermoplastic film from the first reel without substantially damaging the micro holes, wherein the third reel uses electrostatic electricity to remove the thermoplastic film from the first reel by exerting a force via the electrostatic electricity on the macro holes of the thermoplastic film.

10. A device for forming a thermoplastic film with macro holes from a film already having micro holes, comprising:

a first reel with multiple needles on its surface;

a second reel with multiple grooves, the grooves coupled to the needles during the rotation of the first and second reels to obtain the macro holes; and a third reel with perforations, the perforations being coupled with the needles of the first reel during rotation of the first reel to remove the thermoplastic film from the first reel without substantially damaging the micro holes, wherein the third reel uses vacuum to remove the thermoplastic film from the first reel by exerting a force via the vacuum on the macro holes of the thermoplastic film.

11. The device according to claim 10, wherein the third reel comprises:

a fixed and hollow shaft with an opening, along its entire length, sufficiently wide to cover a contact area between the needles and the third reel and inside of which vacuum is formed; and an outer jacket that rotates, during operation of the device, around the fixed and hollow shaft.

12. The device according to claim 10, further comprising one or more grooved reels that cause the formed thermoplastic film to stretch, breaking hardened areas around the formed macro holes.

13. The device according to claim 12, wherein the one or more grooved reels are arranged as axial and/or radial reels to stretch the thermoplastic film in an axial and/or radial direction.

14. The device according to claim 10, wherein the micro holes are on one side of a surface of the thermoplastic film and the macro holes are on another side of the surface of the thermoplastic film.

15. The device according to claim 10, wherein the third reel comprises a vacuum chamber configured to generate the vacuum.

16. The device according to claim 10, wherein density of needles in the first reel equals density of grooves in the second reel.

17. An apparatus for forming a thermoplastic film with macro holes and micro holes, comprising:

a matrix comprising a plurality of micro apertures, wherein the matrix is adapted to form the micro holes in the thermoplastic film; and the device according to claim 10, wherein the thermoplastic film with micro holes formed by the matrix is adapted to be directed to the device.

18. The apparatus according to claim 17, wherein the micro holes are formed upon laying the thermoplastic film on the matrix and subsequently putting the thermoplastic film under vacuum.

* * * * *